(12) United States Patent
Woo et al.

(10) Patent No.: US 6,910,017 B1
(45) Date of Patent: Jun. 21, 2005

(54) INVENTORY AND PRICE DECISION SUPPORT

(75) Inventors: Jonathan Woo, Brookline, MA (US); Michael Levy, Wayland, MA (US); John Bible, Cambridge, MA (US)

(73) Assignee: ProfitLogic, Inc., Cambridge, MA (US)

( * ) Notice: Subject to any disclaimer, the term of this patent is extended or adjusted under 35 U.S.C. 154(b) by 0 days.

(21) Appl. No.: 09/263,979

(22) Filed: Mar. 5, 1999

(51) Int. Cl.[7] .............................................. G06F 17/60
(52) U.S. Cl. ......................................... 705/10; 705/29
(58) Field of Search ....................... 705/400, 10, 28–29

(56) References Cited

U.S. PATENT DOCUMENTS

| | | | |
|---|---|---|---|
| 5,237,496 A | * 8/1993 | Kagami et al. | .............. 364/401 |
| 5,237,498 A | * 8/1993 | Tenma et al. | .................. 705/30 |
| 5,450,314 A | 9/1995 | Kagami et al. | ................ 175/73 |
| 5,758,328 A | 5/1998 | Giovannoli | |
| 5,765,143 A | 6/1998 | Sheldon et al. | |
| 5,933,813 A | * 8/1999 | Teicher et al. | ................. 705/26 |
| 5,974,396 A | 10/1999 | Anderson et al. | |
| 5,983,224 A | 11/1999 | Singh et al. | |
| 6,006,196 A | * 12/1999 | Feigin et al. | .................. 705/10 |
| 6,061,691 A | * 5/2000 | Fox | ............................ 707/104 |
| 6,092,049 A | 7/2000 | Chislenko et al. | |
| 6,205,431 B1 | 3/2001 | Willemain et al. | ............. 705/10 |
| 6,230,150 B1 | * 5/2001 | Walker et al. | .............. 705/400 |
| 6,253,187 B1 | 6/2001 | Fox | |
| 6,341,269 B1 | 1/2002 | Dulaney et al. | .............. 705/22 |
| 6,366,890 B1 | 4/2002 | Usrey | ........................... 705/10 |
| 6,397,166 B1 | 5/2002 | Leung et al. | |
| 6,397,197 B1 | 5/2002 | Gindlesperger | |
| 6,493,678 B1 | 12/2002 | Foster et al. | ................... 705/28 |
| 6,496,834 B1 | 12/2002 | Cereghini et al. | |
| 2001/0014868 A1 | 8/2001 | Herz et al. | |
| 2001/0044766 A1 | 11/2001 | Keyes | |
| 2001/0047293 A1 | 11/2001 | Waller et al. | |
| 2002/0022985 A1 | 2/2002 | Guidice et al. | |
| 2002/0029176 A1 | 3/2002 | Carlson et al. | |
| 2002/0072977 A1 | 6/2002 | Hoblit et al. | |
| 2002/0174119 A1 | 11/2002 | Kummamuru et al. | |

FOREIGN PATENT DOCUMENTS

| | | | | |
|---|---|---|---|---|
| EP | 1271378 A2 | * | 1/2003 | .......... G06G/17/60 |
| JP | 0200184239 A | | 3/2001 | |
| WO | WO 90/09638 A1 | | 8/1990 | |

OTHER PUBLICATIONS

Businessworld, Feb. 5, 2001, Businessworld (Phillippines): Special Feature: Alliances of Accenture: Accenture, Profitlogic team helps retailers enhance sales; Businessworld, issue 1163930, p. 1.*

(Continued)

Primary Examiner—Joseph Thomas
Assistant Examiner—Robert W. Morgan
(74) Attorney, Agent, or Firm—David J. Powsner; Nutter McClennen & Fish LLP

(57) ABSTRACT

From data that includes prices and unit sales of an item of commerce for a succession of time periods during which the item was sold, a relationship is derived that represents variation of unit sales of the item as a function of price and time of sale. A maximum profit is predicted by optimizing the price or inventory or both over time in accordance with the relationship. The optimized price or inventory or both over time are used in connection with making price decisions or inventory decisions or both with respect to marketing the item of commerce. A group of the data is aggregated, the group being chosen so that the aggregated data for the group will have an enhanced signal-to-noise ratio with respect to information about sales trends. The aggregated data for the group is analyzed for use in making price decisions with respect to marketing the items of commerce. A series of charts illustrating variations in sales over time are generated automatically, different charts being for different selected sets of the data.

24 Claims, 7 Drawing Sheets

OTHER PUBLICATIONS

Figure 1:
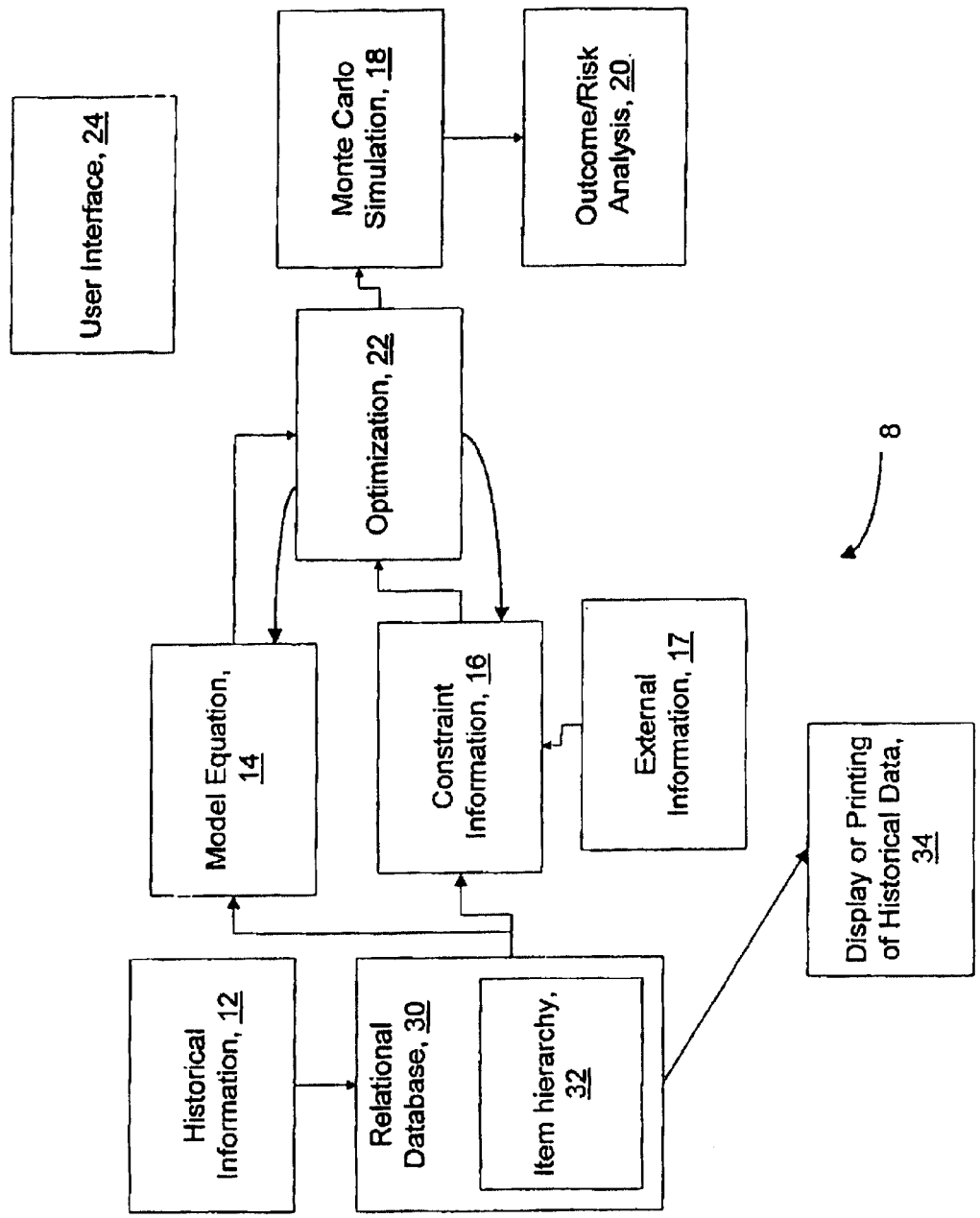

Qinan Wany; May 1998; Improving a supplier's quantity discount gain from many different buyers; Nanyang Business School, School of Mechanical and Productivity Engineering, Nanyang Technological University, Singapore, pp. 1071–1079.*

Technology Strategy, Inc., company marketing materials, copyright 1991, Technology Strategy, Inc.

Spyros Makridakis, "Forecasting", copyright 1997, John Wiley & Sons, Inc., pp. 312, 373–374.

Technology Strategy, Inc., company marketing materials, copyright 1998, Technology Strategy, Inc.

Ackerman, Jerry, "Looking Back to Fashion's Future," The Boston Globe Oct. 7, 1998 [retrieved Jan. 7, 2003], 3 pages, retrieved from: archive. org and Google.com.

Agrawal, Rakesh et al. "Fast Similarity Search in the Presence of Noice, Scaling, and Translation in Times–Series Databases, "Proceedings of the 21st Internaitonal Conference on Very Large Data Bases Sep. 11–15, 1995.

Datz, Todd, "Pythagorean Pantsuits–Modeling Merchandise." *CIO Magazine*, Feb. 15, 1999 [retrieved Jan. 7, 2003], 1 page, retrieved from Google.com and an archive. org.

Gaffney, Scott and Padhraic Smyth, "Trajectory Clustering with Mixtures of Regression Models," *Proceedings: The Fifth ACM SIGKDD International Conference on Knowledge Discovery and Data Mining* Aug. 15–18, 1999, pp. 63–72.

"Gymboree Selects TSI to Design and Implement Inventory Optimization and Pricing Solution," TSI Press Release, Jan. 13, 1999 [retrieved Jan. 7, 2003], 2 pages, retrieved from: Google.com and archive.com.

Jain, Anil K. and Richard C. Dubes, Algorithms for Clustering Data (Prentice Hall: 1988) pp. ix–xi, 1–30.

Keogh, Eamonn and Padhraic Smyth, "A Probabilistic Approach to Fast Pattern Matching in Time Series Databases," Proceedings of the Third Conference in Knowledge Discovery in Databases and Data Mining (1997).

Keogh, Eamonn J. and Michael J. Pazzani, "An Enhanced Representation of Time Series Which Allows Fasst and Accurate Classification, Clustering and Relevance Feedback," *Fourth Conference on Knowledge Discovery in Databases and Data Mining* (1998) pp. 239–243.

Keogh, Eamonn J. and Michael J. Pazzani, "Relevance Feedback Retrieval of Time Series Data," *22nd International Conference on Research and Development in Information Retrieval*, Aug. 1999.

Keogh, Eamonn, "A Fast and Robust Method for Pattern Matching in Time Series Databases," *Proceedings of WUSS* (1997).

Koloszyc, Ginger, "Merchants Try Complex Mathematical Tools to Improve Inventory Decisions," *Stores Magazine* Nov. 1999 [retrieed Jan. 7, 2003], 3 pages, retrieved from: Google.com and archive.org.

Kopalle, Praveen K. et al. "The Dynamic Effect of Discounting on Sales: Empirical Analysis and Normative Pricing Implications," *Marketing Science* 18:3 (1999) 317–332.

Merritt, Jennifer, "Company makes Science out of Shopping Trends," *Boston Business Journal* Sep. 3, 1998 [retrieved on Jan. 7, 2003], 3 pages, retrieved from: Google.com and archive.org.

Rice, John A. "Mathematical Statistics and Data Analysis," 2nd Ed. Duxbury Press pp. xiii–xx, 1–30.

Screenshots of Technology Strategy, Inc., www.grossprofit.com, Mar. 2, 2000 [retrieved on Jan. 7, 2003], 9 pages, retrieved from: Google.com and archive.org.

Silva–Risso, Jorge M. et al. "A Decision Support System for Planning Manufacturers' Sales Promotion Calendars," Marketing Science 18:3 (1999) 274–300.

"Technology Strategy, Inc. Names Jonathan Woo is Director of R&D, " TSI Press Release, Jul. 15, 1998 [retrieved Jan. 7, 2003], 1 pages, retrieved from: Google.com and archive.org.

"Wal–mart: Retailer of the Century: High–Tech Complements Human Touch," *Discount Store News* Oct. 11, 1999. [retrieved Jun. 26, 2002], 3 pages, retrieved from: www.lexus.com.

SAS/STAT User's Guide, Version 8 (SAS Publishing: 1999) pp. 1–129.

Levy, Michael R. and Woo, Jonathan, Ph.D. "Yield Management in Retail: The Application of Advanced Mathematics to the Retail Pricing Dilemma," TSI (Marketing Materials), 1999.

Smith, Stephen A. and Achabal, Dale D. "Clearance Pricing and Inventory Policies for Retail Chains," Management Science 44:3 (Mar. 1998), pp. 285–300.

Achabal et al., A Decision Support System for Vendor Managed Inventory, Winter 2000, Journal of Retailing, vol. 76, No. 4, p. 430.*

* cited by examiner

INVENTORY AND PRICE DECISION SUPPORT

BACKGROUND

This invention relates to inventory and price decision support.

Inventory and price decisions are critical to a distributor of retail merchandise as it seeks to maximize profits within an acceptable level of risk. Inventory decisions involve which products (items) to buy for resale, how much of each item to buy, when to buy, in which stores to place the items for resale, and when to place them in the stores. Pricing decisions determine what initial prices to set for each item and when and by how much to reduce prices.

Inventory and price decisions are made in the context of product demand. Product demand over time may differ for fashion items and basic items. Fashion items (such as high-style dresses) may face rapid shifts in demand and have short lifecycles (measured in months). Basic items (such as men's underwear) exhibit long lifecycles (measured in years) and slowly changing demand.

SUMMARY

In general, in one aspect, the invention features a machine-based method having the following steps. From data that includes prices and sales of an item of commerce for a succession of time periods, a relationship is derived that represents variation of sales of the item as a function of price over time. A maximum profit is predicted by optimizing the price or inventory or both over time in accordance with the relationship. The optimized price or inventory or both over time are used in connection with making price decisions or inventory decisions or both with respect to marketing the item of commerce.

Implementations of the invention may include one or more of the following features. From additional data that includes prices and sales of additional items, additional relationships may be derived that represent variations of sales of the additional items as a function of price over time. Maximum profit may be predicted by optimizing prices or inventories or both over time in accordance with the relationships. The optimized prices or inventories or both over time may be used in connection with making price decisions or inventory decisions or both with respect to the marketing of the items of commerce.

Each item may be a fashion item or a basic item. The data may include historical data. The optimizing may be done by applying a genetic algorithm optimization technique. The optimizing may take account of cross-correlation between items.

A Monte Carlo simulation may be applied to the optimized price sales data to generate a set of predicted outcomes and probability information for respective outcomes. The result of the simulation may be used to evaluate confidence in different ones of the outcomes.

The relationship that represents variation of sales of the item as a function of price over time may include an equation of a particular form, including a trend line factor multiplied by a seasonal variation factor, a decaying exponential term, and/or a demand multiplier term that expresses the relationship of demand for the item to a declining price. The demand multiplier term may include a decay factor which reflects a declining impact of a price drop with time and an exponential factor based on the size of the price drop.

In general, in another aspect, the invention features software stored on a machine-readable medium that configures a machine perform the steps of the method.

In general, in another aspect, the invention features a machine-based method for use in processing data that includes prices and sales of items of commerce for a succession of time periods. A group of the data is aggregated, the group being chosen so that the aggregated data for the group will have an enhanced signal-to-noise ratio with respect to information about sales trends. The aggregated data for the group is analyzed for use in making price decisions or inventory decisions or both with respect to marketing the items of commerce.

In implementations of the invention, the aggregation may be done with respect to time periods, items, or locations in which items are sold and may be done hierarchically.

In general, in another aspect, the invention features a machine-based method for use in processing data that includes prices and sales of items of commerce for a succession of time periods. In this aspect, a series of charts illustrating variations in sales over time are generated automatically, different charts being for different selected sets of the data.

Among the advantages of the invention are one or more of the following.

Higher profits, lower inventory requirements, and more predictable results may be achieved. Large volumes of useful graphs of data may be generated automatically. The relationship between expected profit and risk may be demonstrated graphically. Based on a desired combination of risk and profit, an appropriate price and inventory strategy can be suggested. Large volumes of historical data can be grouped easily by item class. Information about the classification of items may be stored in a table for easy maintenance and future use.

Other advantages and features will become apparent from the following description and from the claims.

DESCRIPTION

Figure 2:
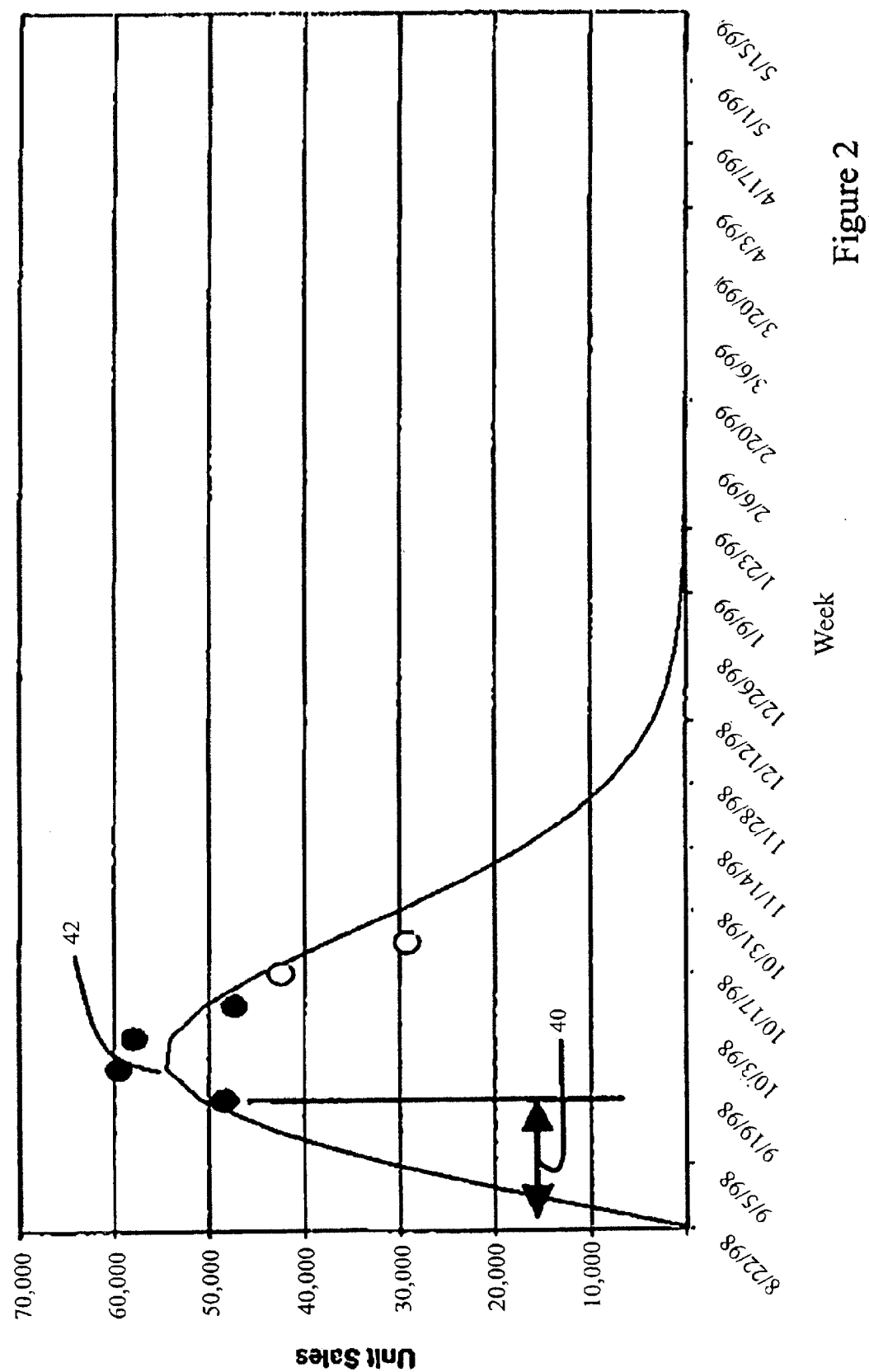
Figure 3:
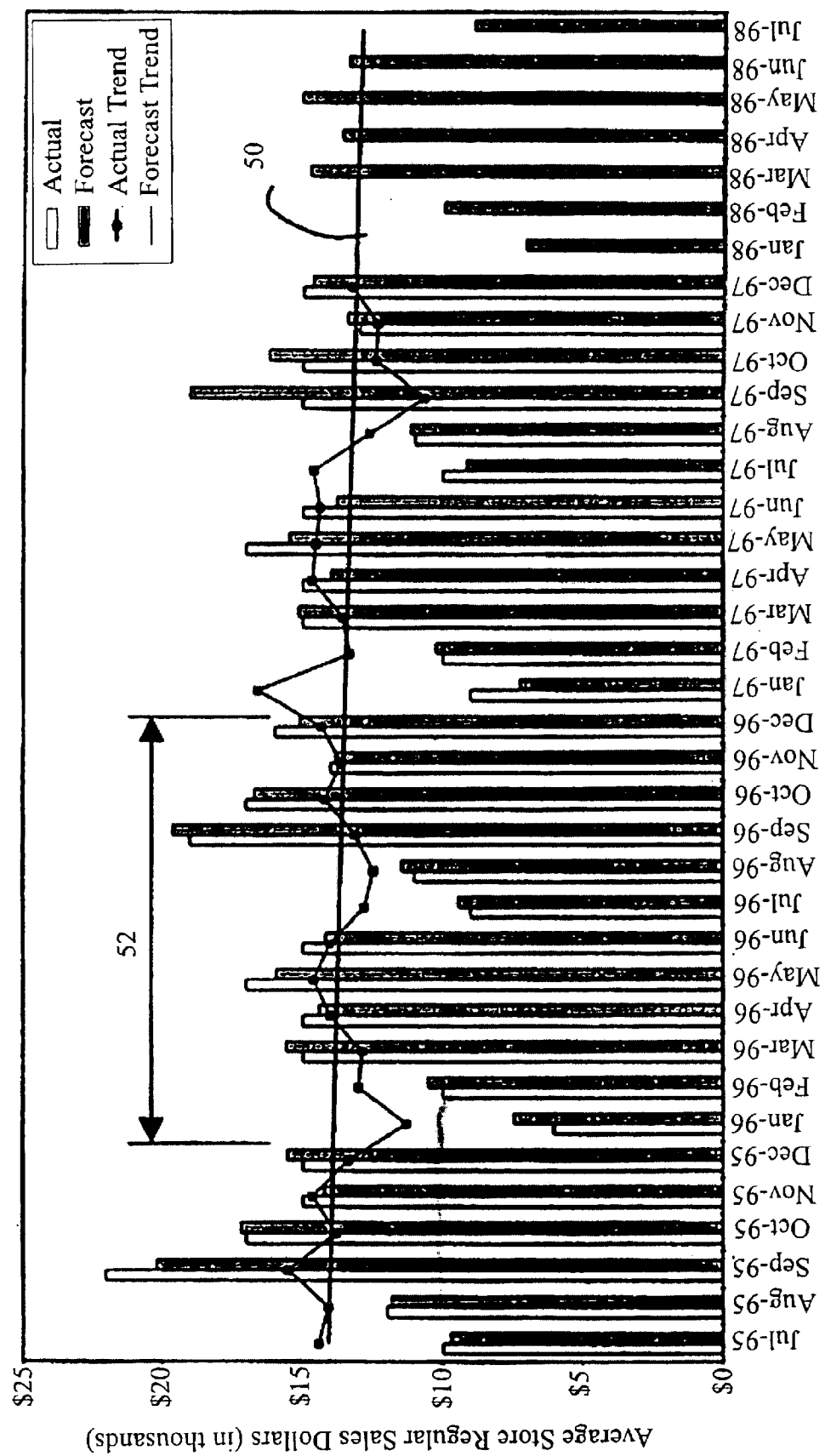
Figure 4:
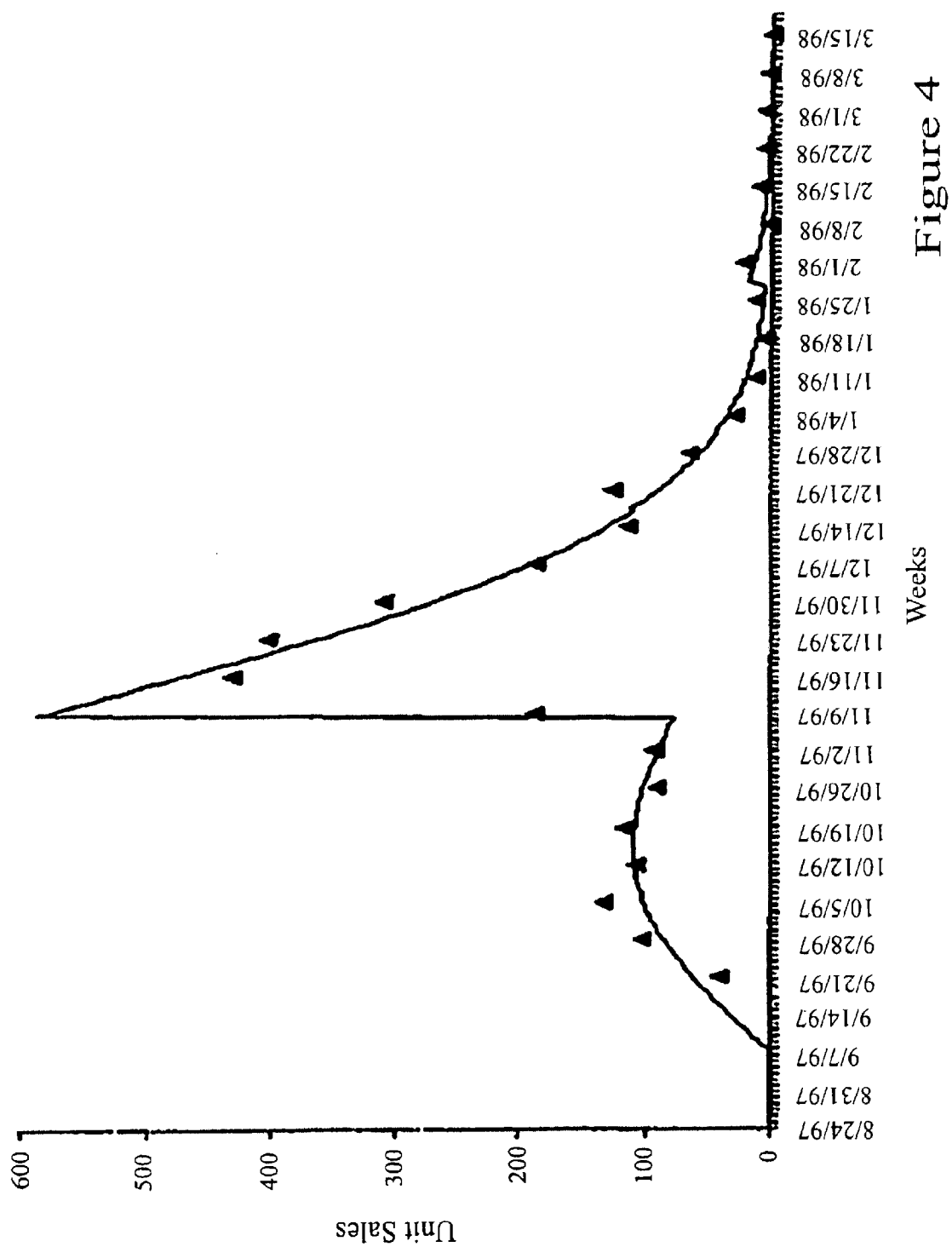
Figure 5:
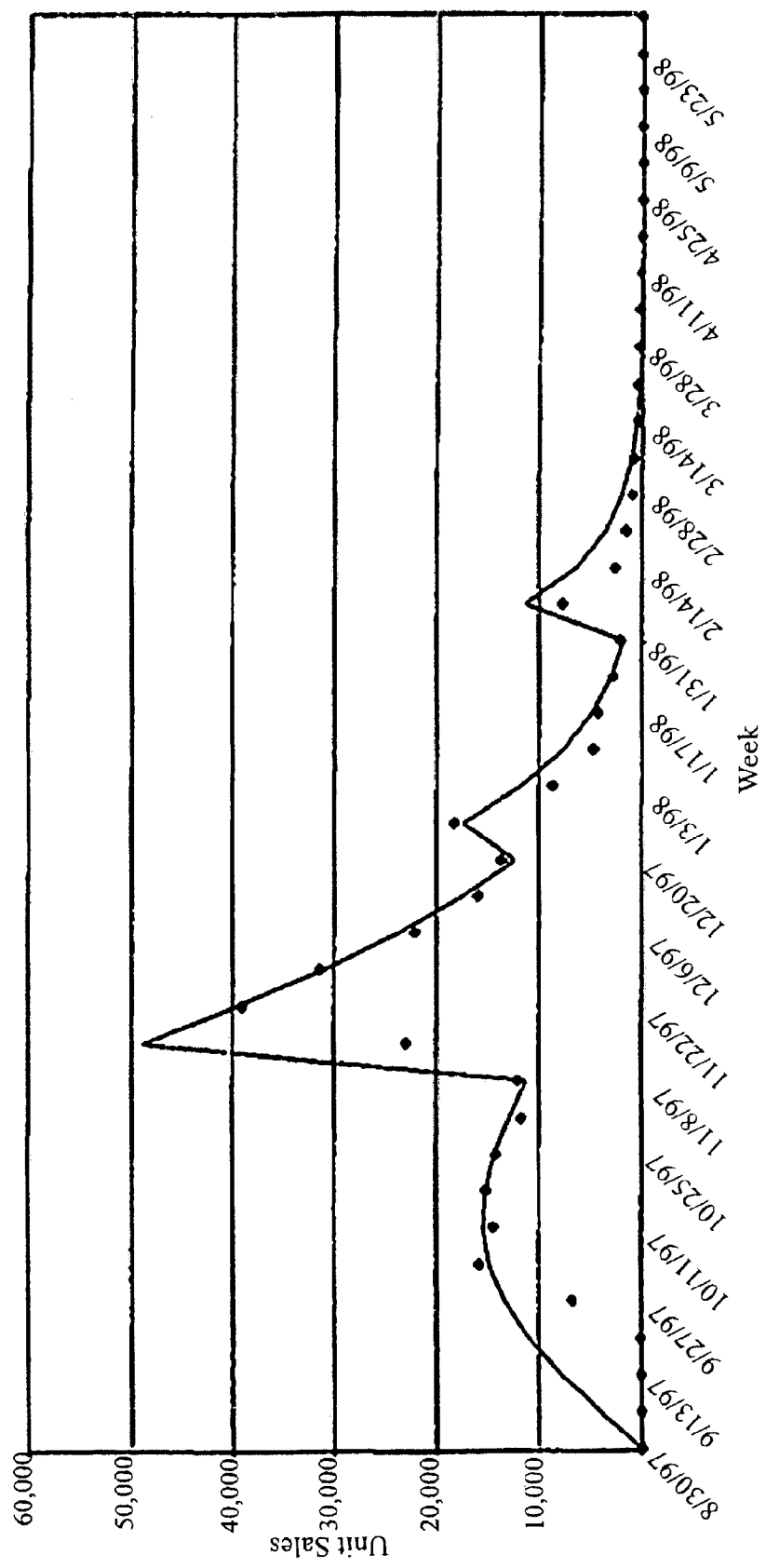
Figure 6:
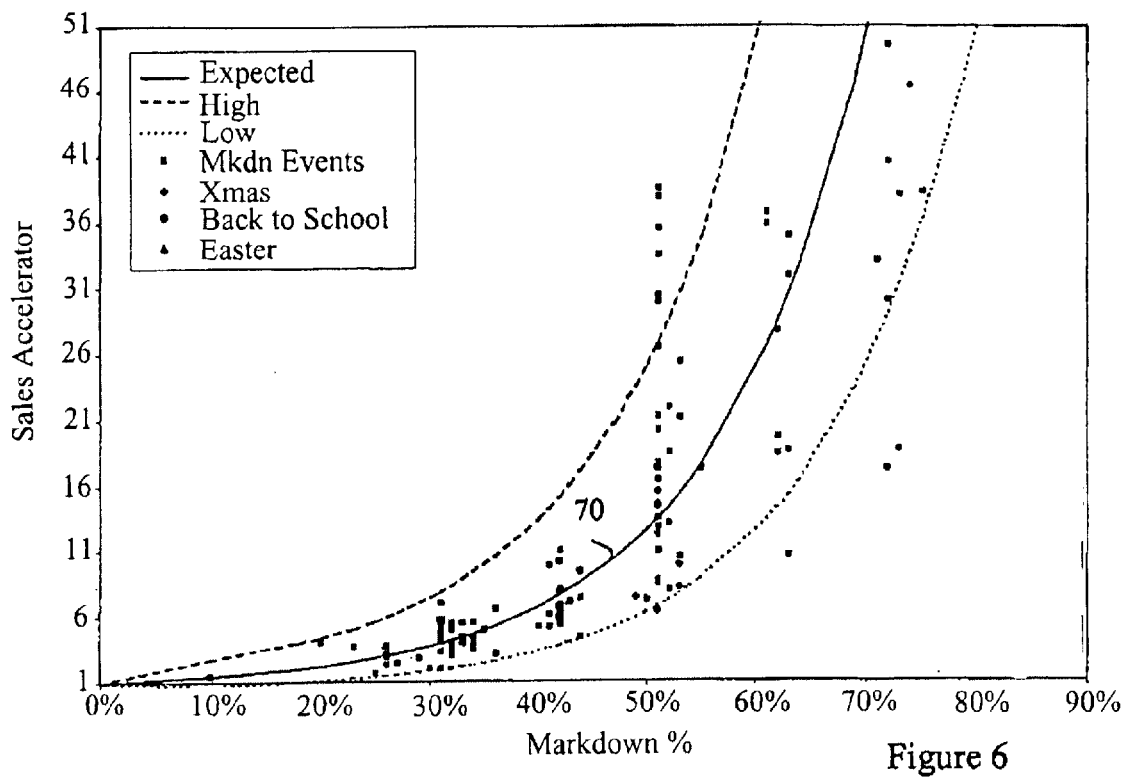
Figure 8:
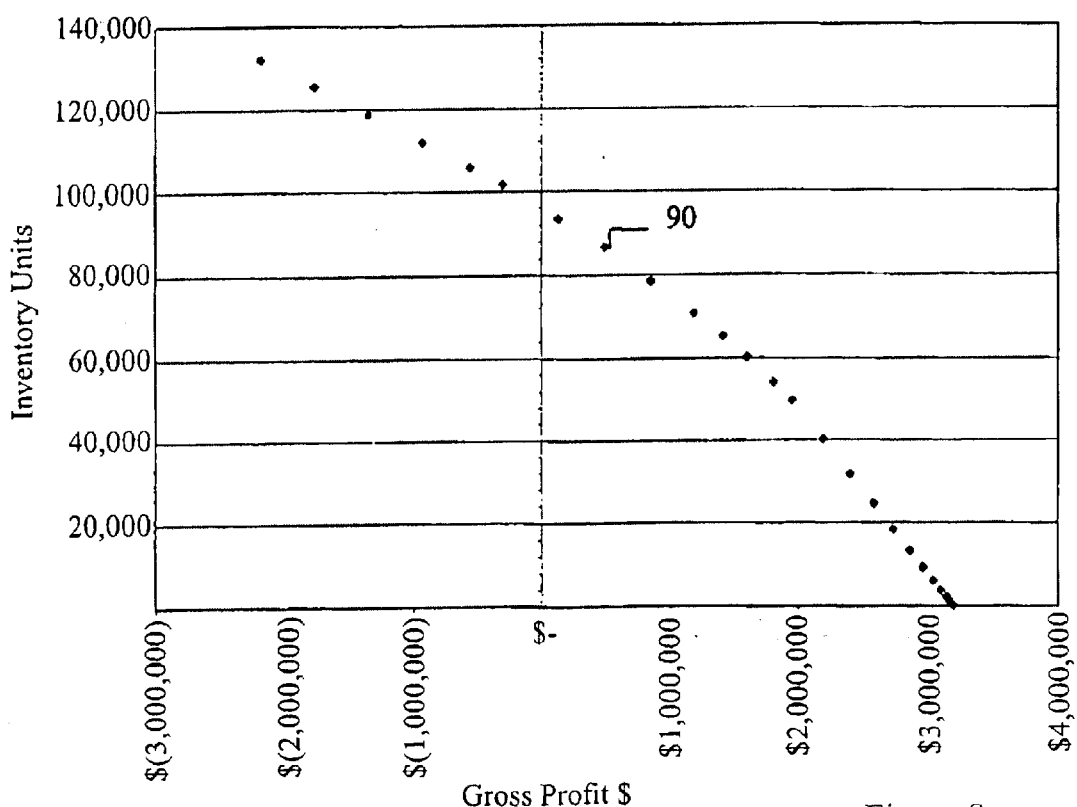
Figure 7:
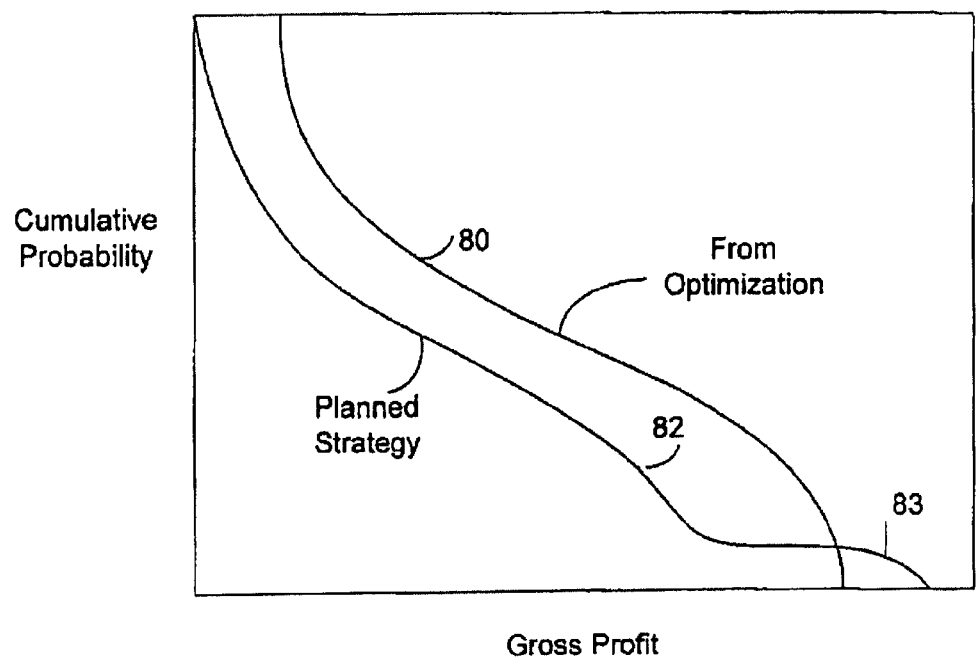

FIG. 1 is a block diagram.
FIG. 2 is a graph.
FIG. 3 is a graph.
FIG. 4 is a graph.
FIG. 5 is a graph.
FIG. 6 is a graph.
FIG. 7 is a graph.
FIG. 8 is a graph.

OVERVIEW

As seen in FIG. 1, a retailer (or a supplier to a retailer) typically maintains large volumes of computer-stored historical information 12 about sales of merchandise. The information may include data for each item sold (for example, girls shoe style 231 in size 4AAA), the identity of each store in which it was sold, and each of a series of periods of time (e.g., successive weeks) during which it was sold. For each item/store/time period combination, the data may include the number of units, price, and cost of sales and inventory of that item sold in that store in that time period.

Retailing patterns for the different items, stores, and periods can be inferred from the historical information. The historical retailing patterns can be used to predict sales and profits that may result from assumed inventory and price decisions for the same items, stores, and periods, or for other similar items, stores, and time periods. Appropriate analysis then can produce more profitable and effective retailing decisions.

The patterns derived from the historical data for a given item in a given store are expressed as a model equation 14 that expresses gross profit as a function of price, time, inventory, and other factors. The model equation may be capable of predicting both realistic outcomes and outcomes that are not realistic possibilities. The model can be constrained to yield only realistic possibilities based on constraint information 16 derived from the retailer, public sources, the historical data, or (in a feedback approach) by observation of optimization results. Using the equation, the constraint information (e.g., the price may not be negative) and additional conditions (for example, a requirement to liquidate all inventory in five months with two markdowns), an optimization 22 is used to maximize gross profit by optimizing Inventory ($I_o$) and price profiles (e.g., markdown sequences or promotional offers). A Monte Carlo simulation 18 is applied to the optimization results to produce a probabilistic distribution of outcomes. The distribution of outcomes may be used to infer levels of risk associated with different outcomes 20.

If the constraints placed on the model are not appropriate, running the model may produce a non-sensible result. The model may then be corrected by adjusting (e.g., tightening) the constraints. For example, a distribution of outcomes may suggest a risk is too high for a desired result. Or the results may be too broadly distributed. For example, the simulation results may imply, within a 90% confidence level, that the resulting profit will be 50%±50%. These results are not helpful because the range of profit is too broad. As an example of adjusting constraints, one might reduce the number of markdowns provided in the model.

A user interface 24 enables a user to observe and manipulate aspects of the analysis to consider a variety of scenarios. We now turn to a more detailed discussion of each step of the analysis.

The historical information 12 is converted to a suitable format and may be stored in a relational database 30. The data stored in database 30 should cover a period that is typically two or three years for a range of merchandise items and stores. The period of time for which data is required may vary but periods of a year or shorter may not be as useful. Such shorter periods imply too little useful information about the historical patterns because they typically represent only a piece of the pattern. As the period for which data is available increases, the amount of available information increases.

Each item for which information is available may be associated with a unique SKU number. For example, a teenage girl's designer jeans in color blue and size 10 could be one item. The data for the jeans item could show daily dollar and unit sales by store location.

The information can be transferred from the retailer's computer to the relational database on tapes or electronically. The volume of data for a large number of items can be very large. The burden of transferring the data can be reduced by data compression. Large compression ratios can be achieved because a large percentage of the data "cells" (e.g., unit sales of one item on a single day in a single store) are empty.

Aggregation of Historical Data

To find useful patterns in the historical information, the information for different items typically should be aggregated into item classes and subclasses in accordance with an item hierarchy 32. By doing this, the impact of "noise" that may be inherent in information for an individual item may be reduced in the aggregate information, making it easier to derive information about the patterns inherent in the data. In a simple example, all items that are of the same style but different sizes and colors could be aggregated into a class.

The database may be stored in any of a variety of formats but it is useful to be able to query the database with a conventional query language such as SQL. SQL queries can be used to aggregate items into classes automatically.

The aggregation of items is done to reflect expected similarities in profit outcomes for given pricing and inventory decisions. The aggregation may be done based on knowledge and experience of the retailer or by looking at the data for different items.

The goal is to aggregate to a level that produces aggregated data having the best signal to noise ratio (e.g., 10%), that is, the best ratio of the mean to the root mean square of the resulting data. One way to choose items to be aggregated is by cross-correlation analyses to find items whose sales' histories are strongly cross-correlated. Further aggregation of items beyond the level where the best signal/noise ratio is achieved may be done to reflect the interests of business managers.

The class structure of items may be stored in a table 32 in the relational database.

Hierarchies may be based not only on items, but on time periods (all sales within the week after Thanksgiving), location (all stores in New Jersey), or on items (all junior sportswear items), or on combinations of them.

Examples of hierarchies are:

Period Hierarchy:
    Fiscal Year
    Season
    Fiscal Quarter
    Fiscal Month
    Fiscal Week Number Item Hierarchy:
    Department
    Class
    Subclass
    SKU Location Hierarchy:
    Chain
    District
    Region
    Store Product Life Cycles One basis for aggregation of items into classes is the fashion nature versus basic nature of items being considered. As seen in FIG. 2, a fashion item typically has a short life cycle (the span from the left side to the right side of the graph) that may be only a few months. The cycle begins with a period 40 in which demand rises rapidly as the item becomes popular. After reaching a peak 42, the demand slowly trails off to zero. The curve does not repeat itself. Although a smooth curve is shown in the figure, there are actually minor fluctuations along the curve. There also are likely to be sharp, brief spikes in demand just after each price markdown, which may be typically timed to occur after the demand peak has been reached. These spikes are not shown in FIG. 2 but are seen in FIGS. 4 and 5.

As seen in FIG. 3, a basic item has a demand profile over time that includes a general trend 50 with seasonal variations 52, some features of which are repeated, e.g., from year to year. The actual curve for a given year will differ in detail from the actual curve for another year.

Charting

Useful portions of the historical data may be produced for display or printing 34 (FIG. 1) before or in parallel with later processing. Automatic charting tools can be created, using Microsoft's Visual Basic for Excel, to automatically generate large numbers of historical charts that show sales over time for classes of items or individual items, classes of locations or individual locations, or classes of periods or individual periods. Examples are shown in FIGS. 4 and 5.

As an example, printing a chart of sales history for every retail department covered by a database may be automated using VisualBasic macros, an Excel Spreadsheet, and an ACCESS database. A database table in ACCESS could store, in each record, the date and unit sales for a given retail department. Thus the chart could have many records for each department, each record associated with an identified date. To print the charts, the macro first sorts all records by department and sorts all records in each department by date. Next, beginning at the first sorted record, the macro selects all records for a single department and copies them into a predetermined range of cells in an Excel spreadsheet. The range of spreadsheet cells is configured to include a dummy chart. The dummy chart uses the data pasted into a range to create a chart. The macro then causes the chart to be printed. The macro then begins the process again by selecting all records for the second department, copying them to the spreadsheet, and causing the second chart to be printed, and so on.

Traditionally, generating such charts has been a labor-intensive process. By generating large numbers of charts automatically, information can be provided to product managers that is not otherwise so readily available to them.

The Model Equation

The predictive model equation 14 is developed from the aggregated historical information and is of the form:

$$\pi \pm \epsilon = f(t, p, I_o, \text{covariance, cost, other factors}),$$

where $I_o$ is an initial inventory, $\pi$ is the gross dollar profit of an item or a class or subclass of items, $\epsilon$ is an error term which represents the confidence range of the prediction for the future and reflects the fact that the historical data includes noise, t is time, p is a profile of price over time (and thus includes promotional offers and markdowns), and cost is the cost of the item or class to the retailer. The other factors include, e.g., competition, economic factors, and demographics that are not represented in the stored historical data. Thus, profit is expressed as a function of two controllable factors (the price profile and initial inventory) and several non-controllable factors.

The covariance terms may reflect relationships between classes of items, for example, the fact that sales of winter coats may be linked with sales of wool hats.

The goal is to derive, from the historical information, a model equation that is a good predictor of future gross profit given profiles of price (p), initial inventory ($I_o$) cost, and other factors.

Because gross profit ($\pi$) is the same as sales dollars (S) minus cost, the predictive model may also be written as:

$$S(t) \pm \epsilon = f(t, p, I_o, \text{covariance, other factors})$$

Two different versions of this general model equation apply to fashion items and basic items because the curves that represent sales of those items over time differ, as explained earlier.

Model Equation for Basic Items

For a basic item, the development of the predictive equation requires determining the trend line 50 in FIG. 3 and determining the seasonal variations 52 that are typically superimposed each year over the trend line.

A trend line factor (T) can be determined by a 12-month moving average calculation on monthly sales from the historical information.

A seasonal variation factor (SF) for a given period during the year can be expressed as historical sales for that period divided by the historically implied trend value for that period. SF is normalized so that the sum of SF for a full year is 1. After the normalized SF value is determined, the slope and intercept of the trend line 50 can be found by linear regression of sales divided by SF for each period. The process is done iteratively.

Unlike some other ways to determine seasonal variation, it has been found useful not to weight the most recent seasonal features more heavily. The process is simpler, more relevant, and less subject to errors caused by aberrant data points.

Once the trend line factor and seasonal factor are derived, they are multiplied to produce a prediction of units of sales (S) of an item or a class of items for a future similar period (e.g., a particular week during each year):

$$S(t) \pm \epsilon = T(t) * SF(t).$$

This model of sales is simple to derive and has been found to work better than some other more complicated time series forecasting techniques including Holt Winters and Box Jenkins.

Model Equation for Fashion Items

The predictive equation for units of sales of a fashion item is different from the one for a basic item:

$$S(t) = N_o * N_c * t^\gamma * [e^{-(t/t_{pk})^\alpha} + C]$$

where $N_o$ is a curve fitting parameter that depends on the scale of the curve, t is time, $t_{pk}$ is the time of the peak sales (e.g., 42 on FIG. 2), $\alpha$ and $\gamma$ are curve fitting constants, C is a residual sales rate at large values of t, and $N_c$ is a function represents a demand multiplier that is a function of price. Unlike the basic curve, the fashion curve is not repeated annually.

The equation represents two competing factors the product of which describes the curve of FIG. 2. The $t^\gamma$ factor dominates during the rapidly rising part of the curve. The exponential factor begins at a value of 1 for t at zero, but becomes very small over time and eventually, following the peak, overwhelms the t factor, forcing the product towards C. In FIG. 2, C is zero.

The constants in the equation can be determined by a curve-fitting algorithm using the Levenberg-Marquardt method of non-linear least squares fit.

In the case of a fashion item, a simple curve fitting technique can be used to fit data to a curve using only a single point instead of the several points normally needed. The single point is the peak on the sales curve. The peak point is found by searching the available data point.

The curve fitting steps required by the above procedure could be done automatically using a macro sequence similar to the one described for printing multiple charts.

The Demand Multiplier $N_c$

The demand multiplier, $N_c$, represents the increase in sales that occurs when price is reduced. Historical data contains information indicative of $N_c$. In FIG. 6, for example, each mark represents a markdown event and is placed to reflect the markdown percentage and the multiple increase in sales. A least squares technique may be used to fit a curve to a table of the markdown demand multipliers of sales increases versus markdown percentages as determined from raw sales data. FIG. 6 shows the fitted curve and upper and lower boundary curves. $N_c$ is a function that can be represented by the product of two exponential factors:

$$N_c = e^{(m/j)^\beta} \cdot e^{-((t-t_{md})/h^{md})\kappa}$$

In the first term, $\beta$ is a constant, m is a markdown fraction (e.g., ⅕ markdown), and j is a constant. The second term represents a decay factor that is especially useful in analyzing sales over time for promotions for basic items. $t_{md}$ is the time of a markdown (or start of a promotional offer in the case of a basic item), t is time, $h_{md}$ is a constant sealing height factor that depends upon merchandise types and brand, and $\kappa$ is a constant.

In FIG. 6, an elbow or sweetspot 70 indicates a markdown percentage for an item or class of items at which the demand multiplier for an incremental additional percentage of markdown accelerates at a greater rate.

Knowing $N_c$ is useful in determining what markdown percentage to use in a later optimization step.

Optimization

Once the predictive model equations have been determined, the maximum expected profit ($\pi$) can be found by performed by a variety of optimization algorithms, e.g., the genetic algorithm.

For a simple optimization problem, the GENEtic Search Implementation System (GENESIS by J. Grefenstette) may be used to find the optimal solution. GENESIS uses the concept of vectors of real number for the genetic structures; therefore, the search parameters can be directly evaluated in the program to obtain the optimal solution. For more complex and time consuming problems, parallel genetic optimization techniques are used to speed up the search for an optimal solution. For parallel processing, the Message-Passing Interface Standard (MPI) system may be used on a cluster of LINUX systems. MPI is based on the concept of multi-computer processes communicating with one another through the message passing system in a network. Processing may be done using a parallel processing genetic algorithm called PGAPack (developed by David Levine when at Argonne National Laboratory) which relies on the MPI system for the parallel processing.

The genetic algorithm permits parallel processing to perform optimizations of different items simultaneously in parallel. Such parallel processing is useful for large data sets.

The effect of the parallel processing of genetic algorithm optimizations is to restore the covariance factors in the equation for $\pi$. Thus, the complete optimization applies to an equation such as $$\pi \text{ (multiple items)} = \begin{bmatrix} \text{covariance} \\ \text{factor} \\ \text{matrix} \\ \text{for item } A \end{bmatrix} f(A) + \begin{bmatrix} \text{covariance} \\ \text{factor} \\ \text{matrix} \\ \text{for item } B \end{bmatrix} f(B) + \ldots - C_{A,B,\ldots}$$

where, e.g., function f(A) is a sales function for item A, and $C_{A, B, \ldots}$ is the total cost of the items.

A single central optimization is performed with computations done iteratively and distributively. Initially a sales forecast for each item i is evaluated using the associated function f(i) based on assumed values of p and $I_o$. The covariance factors are calculated for the initial sales forecasts and the value of $\pi$ is calculated in accordance with the equation set forth above. Next, the values of the p's and $I_o$'s for all items are optimized using the genetic algorithm. In applying the genetic algorithm various populations representing different possible p's and $I_o$'s are distributed to different processing threads so that the optimization work can be done in parallel and therefore in a shorter amount of time. The genetic algorithm processing generates new optimized p's and $I_o$'s. These are applied again to generate sales forecasts based on the functions f(i). A new value of $\pi$ is calculated. The iterations continue until the value of $\pi$ is perceived to have reached or closely approached a maximum value.

Although cross-correlation factors can be chosen based on intuition of a client or analyst, they may also be selected systematically by automatically looking at cross-correlation of coefficients to see if there are patterns of coefficients related to attributes of the curves. Data sets required for cross-correlation could be fetched from the database automatically and fed to a standard cross-correlation routine. The resulting cross-correlation R's could be stored in a cross-correlation coefficient matrix for use in the optimization process.

Monte Carlo Simulation Methods

The p and $I_o$ results of the optimization, or p and $I_o$ values that represent an actual marketing plan of a retailer, can be subjected to Monte Carlo methods that randomly vary the coefficients (e.g., $\beta$, $N_o$, $t_{pk}$) to generate a larger number of outcomes and to determine the certainty of the optimized or planned outcome. Based on the statistical variations of the outcomes, it is possible to predict the probabilities of particular outcomes for a particular item or multiple items.

As seen in FIG. 7, the results of the Monte Carlo simulation may be illustrated by graphing expected gross dollar profit levels along the X-axis and cumulative probability of achieving the result along the y-axis. As shown on curve 80, which represents optimized results, higher expected profits are less likely to occur. A second curve, 82, could represent planned strategies of a marketing manager. The most likely expected profit of the planned strategies could be less than that of the optimal strategy; however, there is a very low probability chance that the planned strategy could be more profitable, as in region 83. A manager can use such a chart in connection with particular scenarios of price markdowns to determine how risk averse he is.

FIG. 8 shows the trajectory of gross profits as a function of inventory in an example where initial inventory is above $3 million. Such a graph can be used to understand the expected performance over time of a given price and inventory decisions and for comparison to the expected performances for other price and inventory decisions. In FIG. 8, each mark 90 could represent a week of sales.

The model equation can be used not only as a predictor at the beginning of a season or a product life cycle, but also during the season or lifecycle, by modifying the model as new actual data on sales becomes available, e.g., each week, to improve prediction.

The user interface provides an interactive front end to the engine that performs the optimization and Monte Carlo analysis.

Other embodiments are within the scope of the following claims.

What is claimed is:

1. Software stored on a machine-readable medium that configures a machine to do the following:

from data that includes prices and unit sales of an item of commerce for a succession of time periods during which the item was sold, derive a relationship of the form $$S(t) = N_o * N_c * t^{\gamma} * [e^{-(t-t_{pk})^\alpha} + C]$$

where S(t) represents gross sales revenues of the item; t is time; $N_o$ is a curve fitting parameter; $N_c$ is a demand multiplier representing an increase in sales that occurs when price is reduced; $t_{pk}$ is a time of peak sales; α and γ are curve fitting constants; C is a residual sales rate at large values of t; and $N_c$ is a function representing a demand multiplier that is a function of price, predict a maximum profit by optimizing the price or inventory or both over time in accordance with the aforesaid relationship and in accord with a relationship wherein profit is equal to sales revenues minus costs, and use the optimized price or inventory or both over time in connection with making price decisions or inventory decisions or both with respect to marketing the item of commerce.

2. A system comprising means for deriving, from data that includes prices and unit sales of an item of commerce for a succession of time periods during which the item was sold, a relationship of the form:

$$S(t)=N_o * N_c * t^{\gamma} * [e^{-(t-t_{pk})^\alpha} + C]$$

where S(t) represents gross sales revenues of the item; t is time; $N_o$ is a curve fitting parameter; $N_c$ is a demand multiplier representing an increase in sales that occurs when price is reduced; $t_{pk}$ is a time of peak sales; α and γ are curve fitting constants; C is a residual sales rate at large values of t; and $N_c$ is a function representing a demand multiplier that is a function of price, means for predicting a maximum profit by optimizing the price or inventory or both over time in accordance with the aforesaid relationship and in accord with a relationship wherein profit is equal to sales revenues minus costs, and means for using the optimized price and sales data over time in connection with making price decisions or inventory decisions or both with respect to marketing the time of commerce.

3. A machine-based method for making price decisions or inventory decisions or both with respect to the marketing of an item of commerce, the method comprising A. executing, on a machine, software that configures the machine to perform the following steps
   i. from data that includes prices and unit sales of the item of commerce for a succession of time periods during which the item was sold, deriving a relationship of the form $$S(t)=N_o * N_c * t^{\gamma} * [e^{-(t-t_{pk})^\alpha} + C]$$

where S(t) represents gross sales revenues of the item; t is time; $N_o$ is a curve fitting parameter; $N_c$ is a demand multiplier representing an increase in sales that occurs when price is reduced; $t_{pk}$ is a time of peak sales; α and γ are curve fitting constants; C is a residual sales rate at large values of t; and $N_c$ is a function representing a demand multiplier that is a function of price,
   ii. predicting a maximum profit for the item of commerce by optimizing price or inventory or both over time in accordance with the aforesaid relationship and in accord with a relationship wherein profit is a function of sales revenues minus costs, and B. using the optimized price or inventory or both in connection with making price decisions or inventory decisions or both with respect to marketing the item of commerce.

4. The method of claim 3 further comprising from additional data that includes prices and unit sales of additional items, deriving additional relationships that represent variations of unit sales of the additional items as a function of price and time of sale, predicting a maximum profit by optimizing prices or inventories or both over time accordance with the relationships, and using the optimized prices or inventories or both over time in connection with making price decisions or inventory decisions or both with respect to the marketing of the items of commerce.

5. The method of claim 3 in which the item comprises a fashion item.

6. The method of claim 3 in which the item comprises a basic item.

7. The method of claim 3 in which the data comprises historical data.

8. The method of claim 3 in which the optimizing comprises applying a genetic algorithm optimization technique.

9. The method of claim 3 further comprising applying a Monte Carlo simulation to the optimized price or inventory or both over time to generate a set of predicted outcomes and probability information for respective outcomes, and using the result of the simulation to evaluate confidence in different ones of the outcomes.

10. The method of claim 3 in which the optimizing takes account of cross-correlation between items.

11. The method of claim 3 in which the relationship that represents variation of sales of the item as a function of price over time comprises an equation of a particular form.

12. The method of claim 3 in which the relationship that represents variation of sales of the item as a function of price over time comprises a trend line factor multiplied by a seasonal variation factor.

13. The method of claim 3 in which the relationship that represents variation of sales of the item as a function of price over time comprises a decaying exponential term.

14. The method of claim 3 in which the relationship that represents variation of sales of the item as a function of price over time comprises a demand multiplier term that expresses the relationship of demand for the item to a declining price.

15. The method of 14 in which the demand multiplier term comprises a decay factor which reflects a declining impact of a price drop with time, and an exponential factor based on the size of the price drop.

16. The method of claim 3 in which the relationship that represents variation of sales of the item as a function of price over time comprises a decaying exponential term.

17. The method of claim 3, further comprising performing curve-fitting to determine one or more of the aforesaid constants.

18. The method of claim 17, wherein the curve-fitting step includes performing curve-fitting using a non-linear least-squares fit.

19. The method of claim 18, wherein the curve-fitting step includes performing the Levenberg-Marquart method.

20. The method of claim 3, further comprising performing curve-fitting to determine the demand multiplier $N_c$.

21. The method of claim 20, wherein the curve-fitting step includes fitting a curve to a table of markdown demand multipliers of sales increases versus mark-down percentages determine from raw sales data.

22. The method of claim 20, wherein the curve-fitting step includes determining $N_c$ is a function of the relation $$N_c = e^{(m/j)^\beta} \cdot e^{-((t-t_{md})/h_{md})^\kappa}$$

where $\beta$ is a constant, m is a markdown fraction, j is a constant, $t_{md}$ is a time of markdown, t is time, $h_{md}$ is a constant that depends on merchandise types and brand, and $\kappa$ is a constant.

23. A machine-based method for making price decisions or inventory decisions or both with respect to the marketing of an item of commerce, the method comprising
    A. executing, on a machine, software that configures the machine to perform the following steps
        i. from data that includes prices and unit sales of the item of commerce for a succession of time periods during which the item was sold, deriving a relationship of the form $$S(t) = N_o * N_c * t^\gamma * [e^{-(t-t_{pk})^\alpha} + C]$$

where S(t) represents gross sales revenues of the item; t is time; $N_o$ is a curve fitting parameter; $N_c$ is a demand multiplier representing an increase in sales that occurs when price is reduced: $t_{pk}$ is a time of peak sales; $\alpha$ and $\gamma$ are curve fitting constants; C is a residual sales rate at large values of t; and $N_c$ is a function representing a demand multiplier that is a function of price,
        ii. performing curve-fitting using a non-linear least-squares fit to determine one or more of the aforesaid constants,
        iii. determining $N_c$ is a function of the relation $$N_c = e^{(m/j)^\beta} \cdot e^{-((t-t_{md})/h_{md})^\kappa}$$

where $\beta$ is a constant, m is a markdown fraction, j is a constant, $t_{md}$ is a time of markdown, t is time, $h_{md}$ is a constant that depends on merchandise types and brand, and $\kappa$ is a constant,
        iv. predicting a maximum profit for the item of commerce by optimizing price or inventory or both over time in accordance with the aforesaid relationship and in accord with a relationship wherein profit is a function of sales revenues minus costs, and
    B. using the optimized price or inventory or both in connection with making price decisions or inventory decisions or both with respect to marketing the item of commerce.

24. The method of claim 23, wherein the optimizing step includes applying a genetic algorithm optimization technique.

\* \* \* \* \*

UNITED STATES PATENT AND TRADEMARK OFFICE
CERTIFICATE OF CORRECTION

PATENT NO. : 6,910,017 B1
DATED : June 21, 2005
INVENTOR(S) : Jonathan W. Woo, Michael Levy and John Bible It is certified that error appears in the above-identified patent and that said Letters Patent is hereby corrected as shown below:

Title page,
Item [56], References Cited, U.S. PATENT DOCUMENTS, insert the following:

| | | |
|---|---|---|
| -- 6,293,866 | 09-25-2001 | Walker et al. |
| 6,306,038 | 10-23-2001 | Graves et al. |
| 6,328,648 | 12-11-2001 | Walker et al. |
| 6,331,144 | 12-18-2001 | Walker et al. |
| 6,520,856 | 02-18-2003 | Walker et al. |
| 6,553,352 | 04-22-2003 | Delurgio et al. |
| 2003/0028437 A1 | 02-06-2003 | Grant et al. |
| 2003/0046127 A1 | 03-06-2003 | Crowe et al. |
| 6,308,162 | 10/23/2001 | Ouimet et al. |
| 5,822,736 | 10/13/1998 | Hartman et al. |
| 5,987,425 | 11/16/1999 | Hartman et al. |
| 6,029,139 | 02/22/2000 | Cunningham et al. --. |

FOREIGN PATENT DOCUMENTS, insert the following:
    -- WO 98/21907    05-22-1998    Vedel, Peter --.
OTHER PUBLICATIONS, insert the following:
-- Fair Market to Take Guesswork Out of Sale Pricing With New Performance-Based Markdown Engine; Major Step in Online Selling to Help Merchants Maximize Margin," Business Wire, May 21, 2001. (3 pages) --.

Column 8,
Line 63, replace the equation with the following -- $S(t)=N_0*N_c*t^{\gamma}*[e^{-(t/t_{pk})^a}+C]$ --.

Column 9,
Line 20, replace the equation with the following -- $S(t)=N_0*N_c*t^{\gamma}*[e^{-(t/t_{pk})^a}+C]$ --.
Line 49, replace the equation with the following -- $S(t)=N_0*N_c*t^{\gamma}*[e^{-(t/t_{pk})^a}+C]$ --.

Column 11,
Line 19, replace the equation with the following -- $S(t)=N_0*N_c*t^{\gamma}*[e^{-(t/t_{pk})^a}+C]$ --.

UNITED STATES PATENT AND TRADEMARK OFFICE
CERTIFICATE OF CORRECTION

PATENT NO. : 6,910,017 B1
DATED : June 21, 2005
INVENTOR(S) : Jonathan W. Woo, Michael Levy and John Bible It is certified that error appears in the above-identified patent and that said Letters Patent is hereby corrected as shown below:

<u>Column 12,</u>
Line 10, following $T_{md}$, delete "$_{\text{is a time of markdown, t is time, hmd}}$", and insert
-- is a time of markdown, t is time, $h_{md}$ --.

Signed and Sealed this

Twenty-first Day of February, 2006

JON W. DUDAS
*Director of the United States Patent and Trademark Office*